United States Patent [19]

Zehnder

[11] Patent Number: 5,456,368
[45] Date of Patent: Oct. 10, 1995

[54] HOLDER FOR CD CASSETTES

[76] Inventor: Richard Zehnder, Seestrasse 201, Kilchberg, Switzerland, CH-8802

[21] Appl. No.: 292,095

[22] Filed: Aug. 17, 1994

[30] Foreign Application Priority Data

Aug. 19, 1993 [CH] Switzerland ............................ 2472/93

[51] Int. Cl.$^6$ ..................................................... A47B 81/06
[52] U.S. Cl. ............................ 211/40; 211/88; 206/387.1; 206/480; 206/482
[58] Field of Search .................................. 211/13, 40, 41, 211/72, 89; 248/309.1; 312/9.9, 9.63; 206/309, 387, 477, 478, 480, 482, 454, 560, 565; 403/326, 397

[56] References Cited

U.S. PATENT DOCUMENTS

| | | | |
|---|---|---|---|
| 3,532,213 | 10/1970 | Schulz | 206/62 |
| 4,119,204 | 10/1978 | Peckar | 206/521 |
| 4,489,830 | 12/1984 | Charlebois et al. | 206/316 |
| 4,793,479 | 12/1988 | Otsuka et al. | 206/310 |
| 4,892,189 | 1/1990 | Kunimune et al. | 206/232 |
| 4,919,287 | 4/1990 | Haskett et al. | 211/41 |
| 4,951,826 | 8/1990 | Tompkins | 211/40 |
| 5,040,687 | 8/1991 | Whittington | 211/40 |
| 5,052,564 | 10/1991 | Zuzack | 211/40 |
| 5,072,836 | 12/1991 | Gross | 211/40 |
| 5,232,089 | 8/1993 | Kim | 206/309 |
| 5,351,835 | 10/1994 | Hallgren | 211/40 |

FOREIGN PATENT DOCUMENTS 536476  4/1993  European Pat. Off. ................ 312/9.9

*Primary Examiner*—Leslie A. Braun
*Assistant Examiner*—Catherine S. Collins
*Attorney, Agent, or Firm*—Weingarten, Schurgin, Gagnebin & Hayes

[57] ABSTRACT

A holder for CD cassettes is disclosed. A relatively thin support wall (21) is provided with a number of receiving sites (22) for CD cassettes (100). Each receiving site (22) corresponds to the surface area of a CD cassette (100) and has at least three clips (3). The clips (3) are arranged in such a way that an inserted CD cassette (100) is held partially surrounded on at least three sides. It is thereby possible to remove a CD from the cassette to play it, without removing the cassette (100) itself from the receiving site (22) on the holder (2). The CD holder (2) can also be used as a wall decoration, or even configured as a work of art.

9 Claims, 4 Drawing Sheets

CD-Box prior art

HOLDER FOR CD CASSETTES

FIELD OF THE INVENTION

The invention concerns a holder for the decorative display and storage of compact disk cassettes.

BACKGROUND OF THE INVENTION

Decorative jackets for recorded music media were attached to the walls of rooms and sales areas for decorative purposes during the early years of the so-called long-play (LP) records. So long as these jackets were made of paper or cardboard, they could either be nailed directly to the wall or attached with staples. But these options are not available with the standardized plastic cassettes used for compact disks.

Recently, U-shaped rails are frequently attached to walls to permit the arrangement and display of compact discs in plastic cassettes. But these have several disadvantages. First of all, they do not permit individual cassettes to be taken out of the holders at random, it being necessary rather to remove the neighboring cassettes first, should the desired cassette not happen to be the one in front. The achievable display image of several CD cassettes also leaves much to be desired. Furthermore, the displayed cassettes cannot be opened without first removing them from the holder.

Available on the market are various types of arrangements for the storage of CD cassettes. These all take the form of so-called CD boxes or CD towers. In the case of both boxes and towers, the CD cassettes are inserted from between side bars. The CD cassettes are nearly horizontal when stored. To be able to use a CD, it is always necessary to pull the entire CD cassette out of the box or tower. Only then can the cassette be opened and the CD removed for playing. The CD cassettes stored in these racks are difficult to identify, because only the small lettering on the end of the CD cassette can be read. The frequent removal and handling of the CD cassettes easily leads to damage, making it necessary to replace them.

SUMMARY OF THE INVENTION

The goal of the invention is to create a device for the storage of CD cassettes, in which case the CD cassette can remain in the device while playing the CD, it being necessary to remove only the CD. Moreover, the identification of the CDs is simpler.

An additional advantage of the invention is that the entire title picture on each cassette is visible at all times. That makes the invented device suitable for the storage of CD cassettes and also for use as a display rack.

A further advantage of the invention is that the device can be constructed on the modular principle. The individual modules are thus useful as more or less freely configurable decorative elements for homes and business areas.

The invention thereby makes use of the standardized form of the CD cassettes.

BRIEF DESCRIPTION OF THE DRAWINGS

The invention is described in conjunction with the drawings.

DETAILED DESCRIPTION OF THE INVENTION

Figure 1:
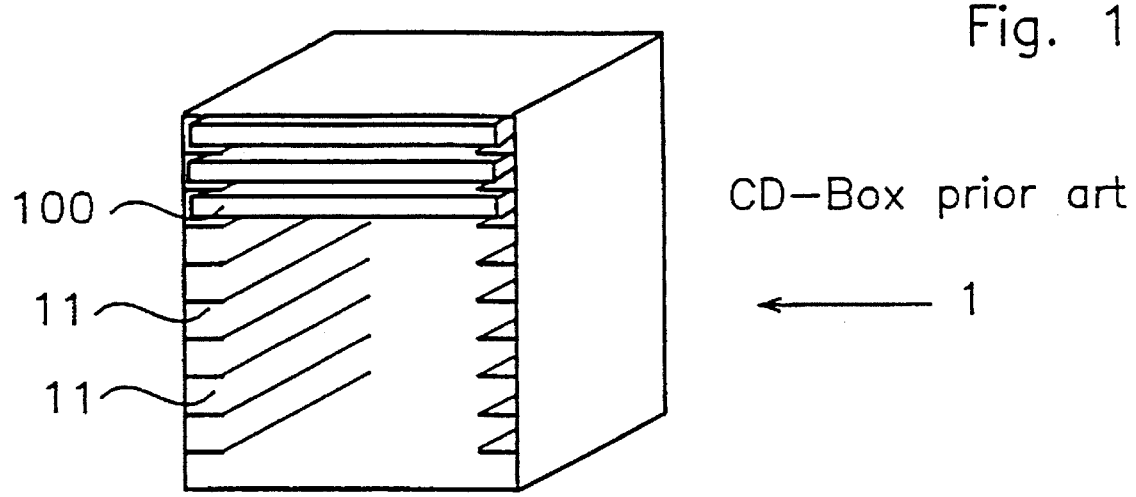
FIG. 1 shows a prior art CD box.

A CD box 1 for the storage of CD cassettes per the state of the art (prior art) is shown in FIG. 1. It is open to one side. Side bars 11 are arranged on at least two opposing side walls, facing inward. CD cassettes can be inserted in the spaces between each two neighboring side bars, lying opposite and above one another. The inserted CD cassettes 100 lie with their flat sides parallel, one above the other. Thus, only one side face of each cassette 100 is visible from the open side of the CD box 1. To remove a CD, the desired CD cassette 100 must first be identified from the label on the visible side, and pulled out of the CD box 1. Only then can the CD cassette 100 be opened and the compact disk removed for playing.

Figure 2:
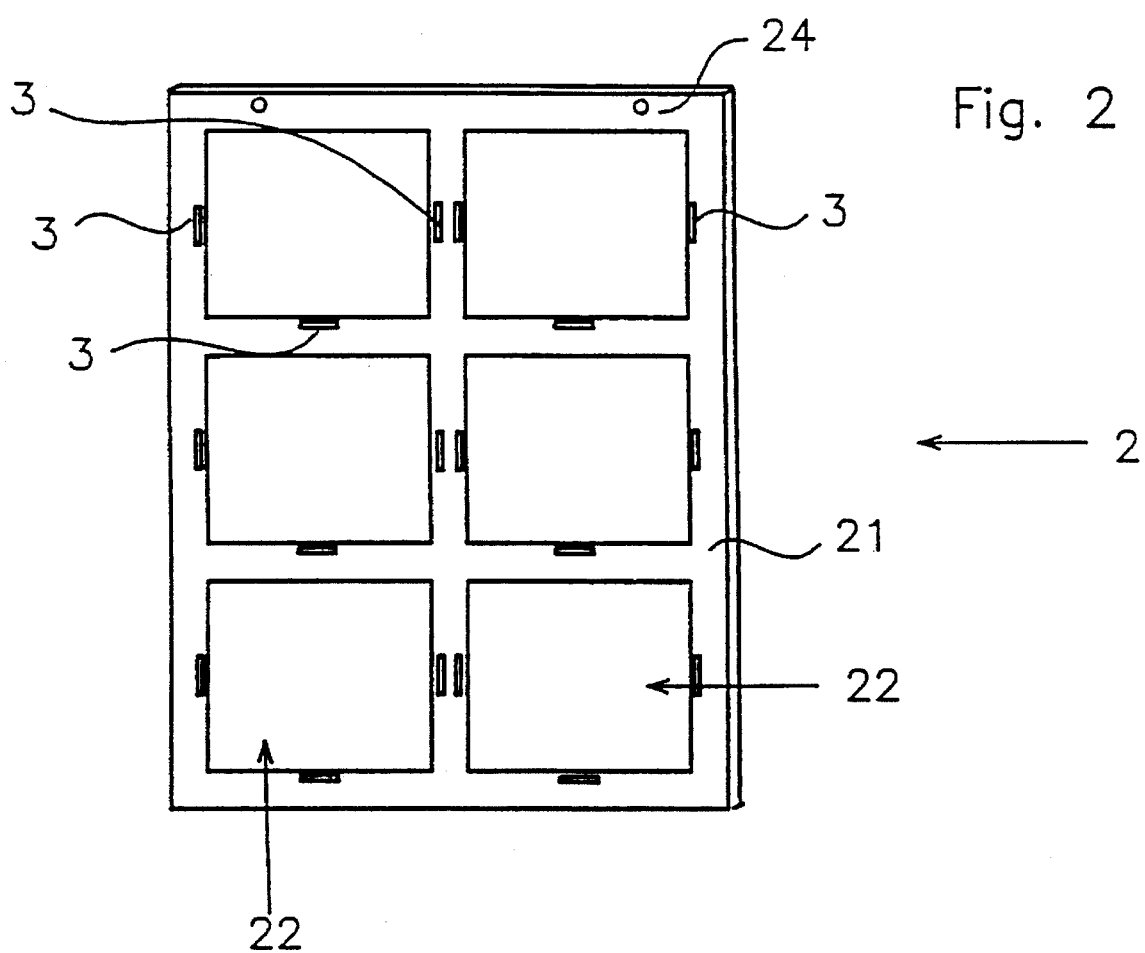
FIG. 2 shows the CD holder of the present invention.

A holder 2 per the invention for CD cassettes is shown in FIG. 2. A relatively thin support wall 21 holds a number of receiving sites 22 for the CD cassettes 100. This support wall can be made of plexiglass, or of other suitable materials like plywood, metal or sheet plastic. It can be equipped with means to hang it up 24, such as holes, hooks or the like, for attachment to an object or a wall. The suspension means 24 can also be configured artistically as a decorative element. An example of such a configuration could be a star-shaped enlargement of the support panel 21 over the entire service of the receiving sites 22.

Each receiving site 22 corresponds to the surface area of a CD cassette 100 and has exhibits at least three clips 3. The clips 3 are arranged in such a way that an inserted cassette 100 will be held, at least partially surrounded, on at least three of its side faces 105, 106. It is obvious that an arrangement of four clips 3, one for each side face of the cassette 100, produces an even more stable arrangement. It is recommended thereby that each clip 3 be so positioned so that it will be approximately at the center of the side face of the inserted cassette 100.

The support panel 21 does not have to be rectangular as shown in the example in FIG. 2. It can also be stepped or have an irregular shape. The arrangement of the receiving sites 22 for the CD cassettes 100 can likewise be regular irregular, straight, angled, circular or in any pattern desired. In this way, it is possible for the invented CD holder 2 to be used as a decorative element on a wall, or even configured as a decoration or art object.

Figure 3:
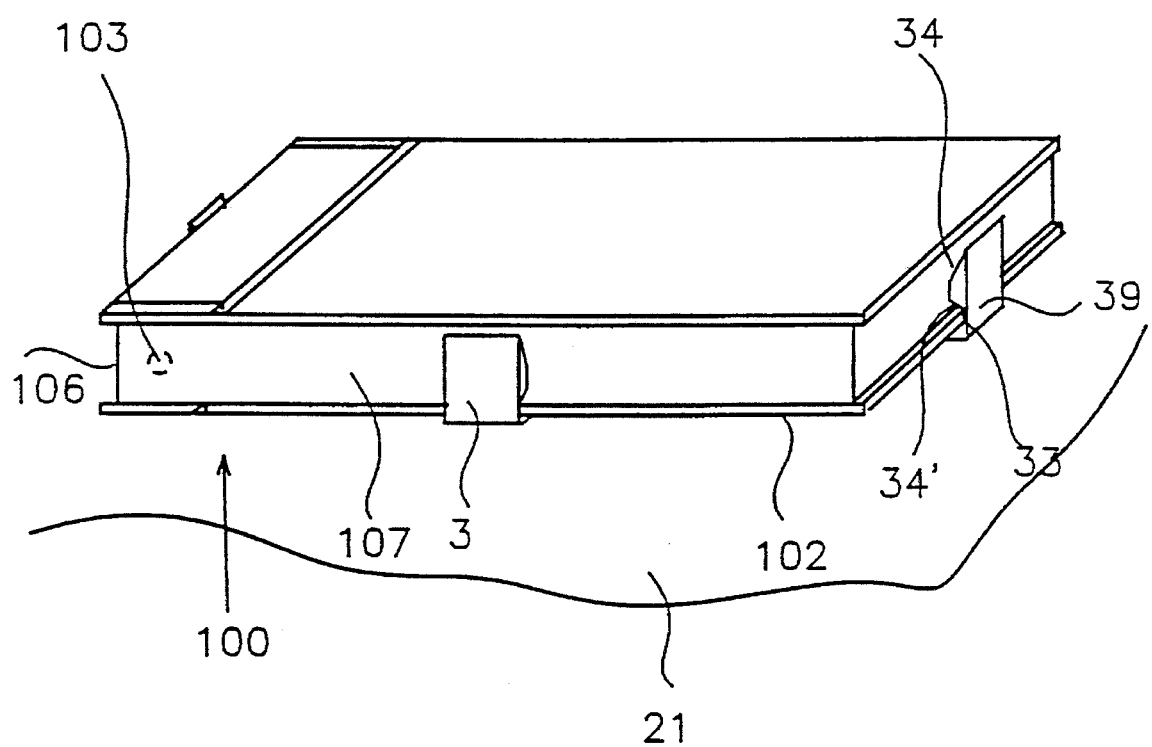
FIG. 3 is a view of a CD cassette together with clips.

A perspective view of a standardized CD cassette is seen in FIG. 3. It consists of a cassette bottom 102 and cover 104, side faces 105, 106 and two hinge pins 103. Cassette bottom 102 and cover 104 extend past the side faces 105, 106 all the way around. That means, they form a small ridge on all sides. The clips 3 attached to the support panel 21 hold the projecting edges of the cassette bottom 102 in their retaining grooves 33. The clips 3 have a press-in surface 34 and a press-out surface 34'. The press-in surface 34 is angled relative to the side face of the cassette in such a way that the flexible zone 39 of the clip 3 yields somewhat in an outward direction when a CD cassette is inserted, and it becomes possible to press the cassette 100 inward until the projecting edges snap into the retaining grooves 33. A similar purpose is served by the press-out surface 34', when the cassette is removed. This surface, too, permits the clip to be bent outward in the flexible zone 39 on removal of the cassette. Three or four clips 3 of a receiving site 22 are so arranged that the rectangle, circumscribed by the retaining grooves 33 of the clips 3 corresponds exactly to the perimeter of the cassette bottom 102.

Double cassettes for two compact discs have two cassette covers 106 or, in other words, no cassette bottom 105. One cassette cover 106 must in that case function as the cassette bottom 104. The operation of the clips 3 remains the same.

Figure 4:
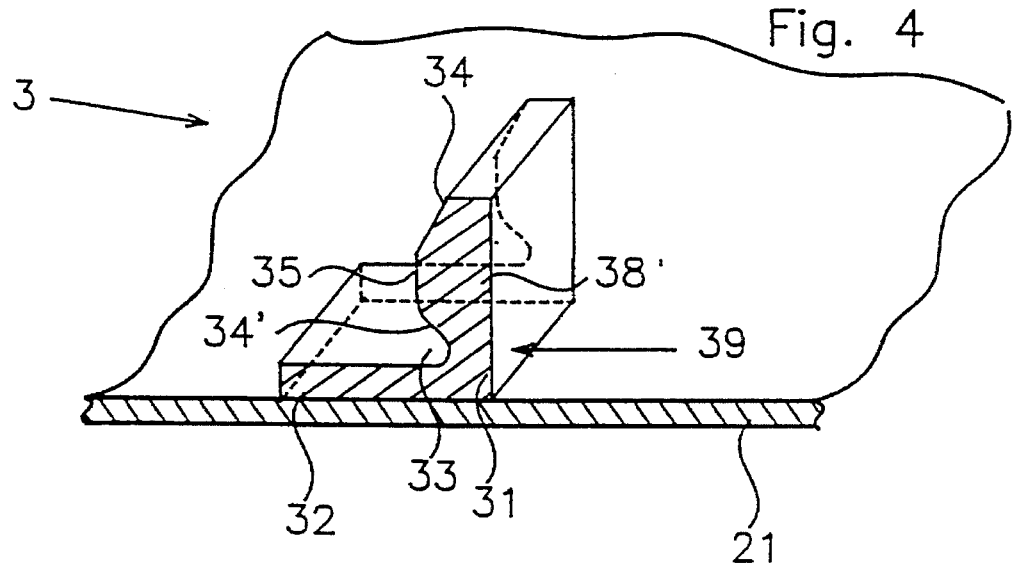
FIG. 4 is a view of an alternative clip.
Figure 5:
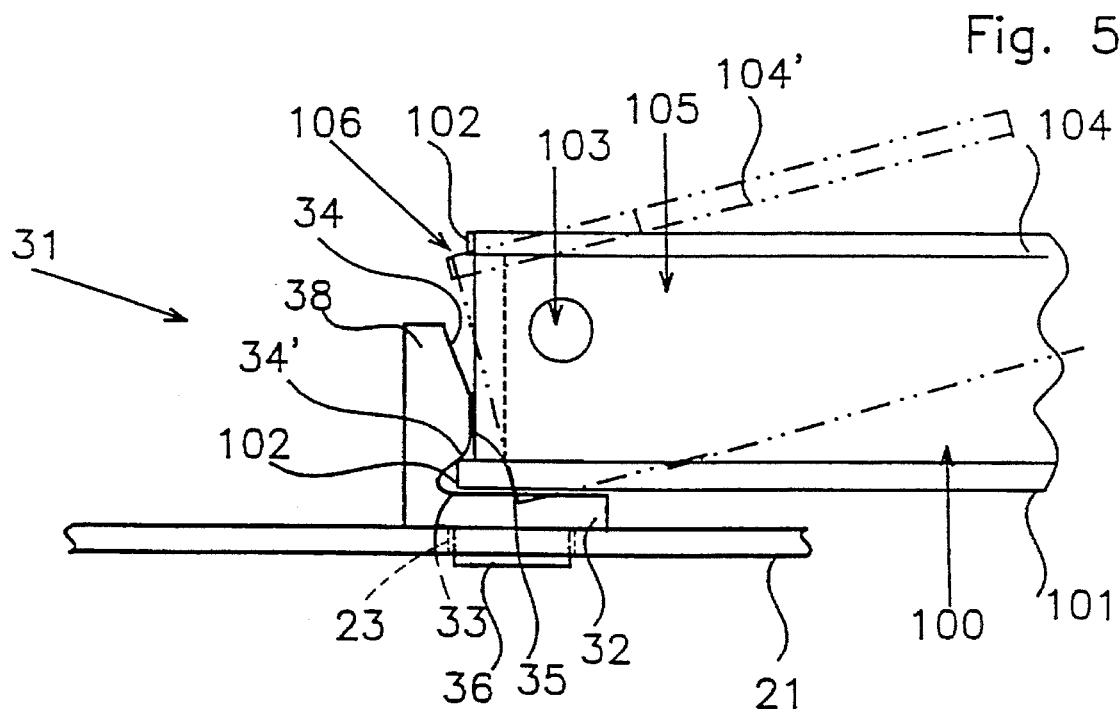
FIG. 5 shows a clip together with a CD cassette.
Figure 6:
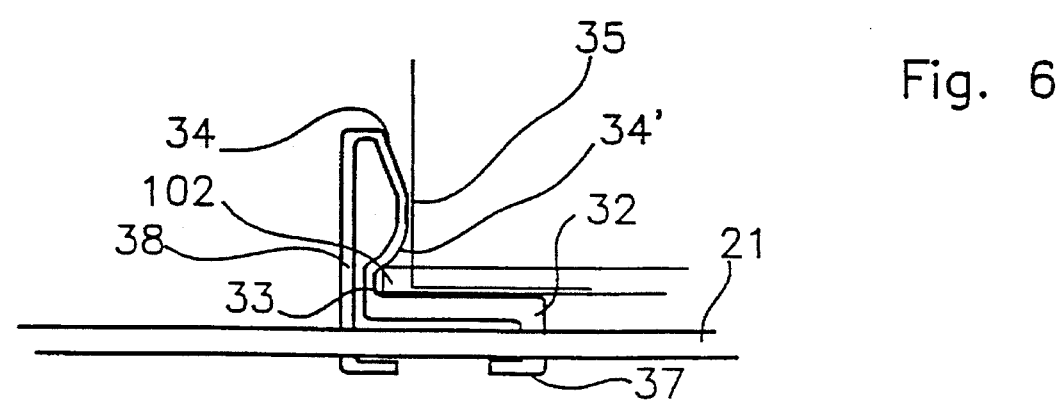
FIG. 6 is a clip variant made from a different material.

Shown in FIG. 4 is a perspective view of a variant of a clip 3 and, in FIG. 5, a side view. The clip 3 is attached to a support panel 21. In the example in FIG. 4 it is attached using cement. In the example shown in FIG. 5, it is equipped with a retaining lug 36 which passes through an appropriately shaped opening 23 in the support panel 21. The clip is made from acrylic glass. But it can also consist of any other suitable material. It is clear that the variants must be constructed from appropriate materials. The functional requirements must be met, however, but remain always the same. A variant made of spring steel or of another sheet metal is seen in FIG. 6. The clip 3, in the case of this type of manufacture, does not exhibit a solid clip body 31, but consists of a suitably bent strip of metal.

The body 31 of the clip 3 exhibits an essentially L-shaped cross section. One arm of the clip body 31 is a stop 32 and lies upon the support panel 21 to which it is parallel. The second arm forms a clamp arm 38, which stands nearly vertical relative to the support panel 21. The clamp arm 38 forms, on the side facing the cassette, a retaining groove 33 in the transition to the arm forming the stop, and a retaining boss 35. The end of the retaining boss 35 facing the end of the arm exhibits a press-in surface 34. The cross section of the clip arm 38 thus tapers in the direction of the tip of the arm. Between the retaining boss 35 and the retaining groove 33 is a press-out surface 34', which is angled in the direction opposite to that of the press-in surface 34. The cross section of the clip arm is thinnest in the vicinity of the retaining groove 33. A flexible region 39 is thus formed at that point.

Whenever a CD cassette 100 is to be inserted, it is held with its cassette bottom 101 between the three clips 3 of a receiving site 22, on the press-in surfaces 34 of the clip arms 38, and pressed down gently by hand until the projecting cassette rim snaps into the retaining grooves 33. The clamp arms 38 are thereby briefly forced back somewhat. On removal of a cassette 100 from the receiving site 22, the same analogous action takes place via the press-out surfaces 34'.

An inserted cassette 100 is held with its cassette bottom 102 in the retaining grooves 33, between the three clips 3 of a receiving site 22. The retaining boss 35, projecting laterally, positions and holds an inserted CD cassette 100 additionally on its edge face 106.

When the clip 3 is configured with an arm 32 serving as a stop, an inserted cassette 100 is held away from the support panel 21 with a small gap. This makes it easier to open the cover 104 of the inserted cassette, because the side faces 105, which pivot outward with the cover 104, move backward slightly relative to the cassette bottom when pivoting on the pins 103. Moreover, it is thus not possible for the cover to come into contact with the support panel 21 when the inserted cassette is opened. This prevents the cassette from being accidentally pressed out of the receiving site 22. In addition, this minimal clearance makes it in any case easier to remove the CD cassette 100 from the receiving site 22, because the cassette can be grasped more easily with the fingers.

In FIG. 5, the CD cassette 100 is shown with the cover 104 closed, and with a partially opened cover 104'. The CD can be directly removed from the CD cassette 100 for playing and then put back again, without the need to remove the CD cassette from the CD holder 2.

Appearing in FIG. 6 is a different variant of the clip 3, shown from the side. It consists of a thin metal strip, for example, one made of spring steel. The clip thus does not exhibit a true clip body 31. All the functional elements, namely, the stop arm 32, the clamp arm 38, the press-in surface 34, the press-out surface 34', the retaining boss 35 and retainer groove 32 are present, as described above. The length of the clamp arm 38 and stop arm 32 is extended with tongues 37. The tongues 37 pass through the support panel and are bent over on the back side.

The receiving sites 22 on the support panel 2 can be configured for all sizes of standardized CD cassettes which have a projecting cassette bottom 102. This is also the case for double cassettes, CD-single and minidisc cassettes.

Further possibilities for development are mentioned below.

To produce a transport container for CD cassettes, one or more of such holders 2 can be securely mounted in a box.

Figure 8:
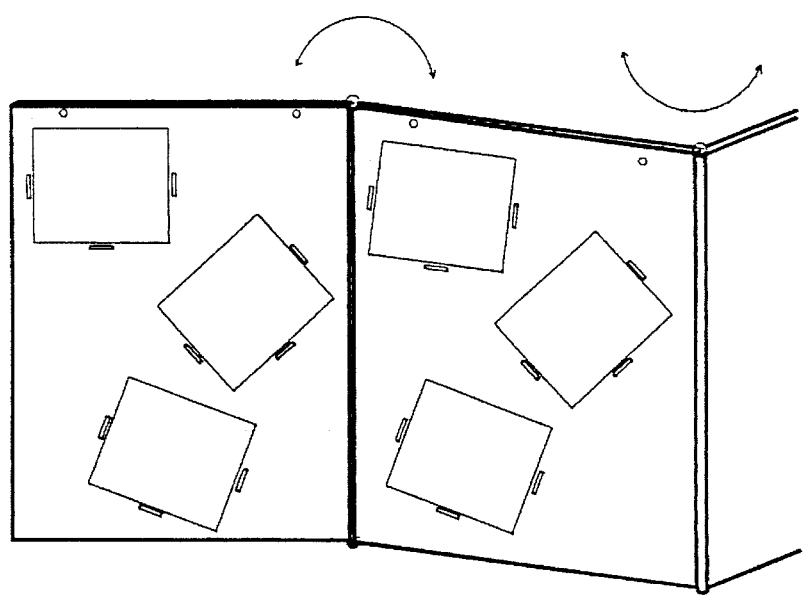
FIG. 8 shows a subdivided pivoting panel.
Figure 7:
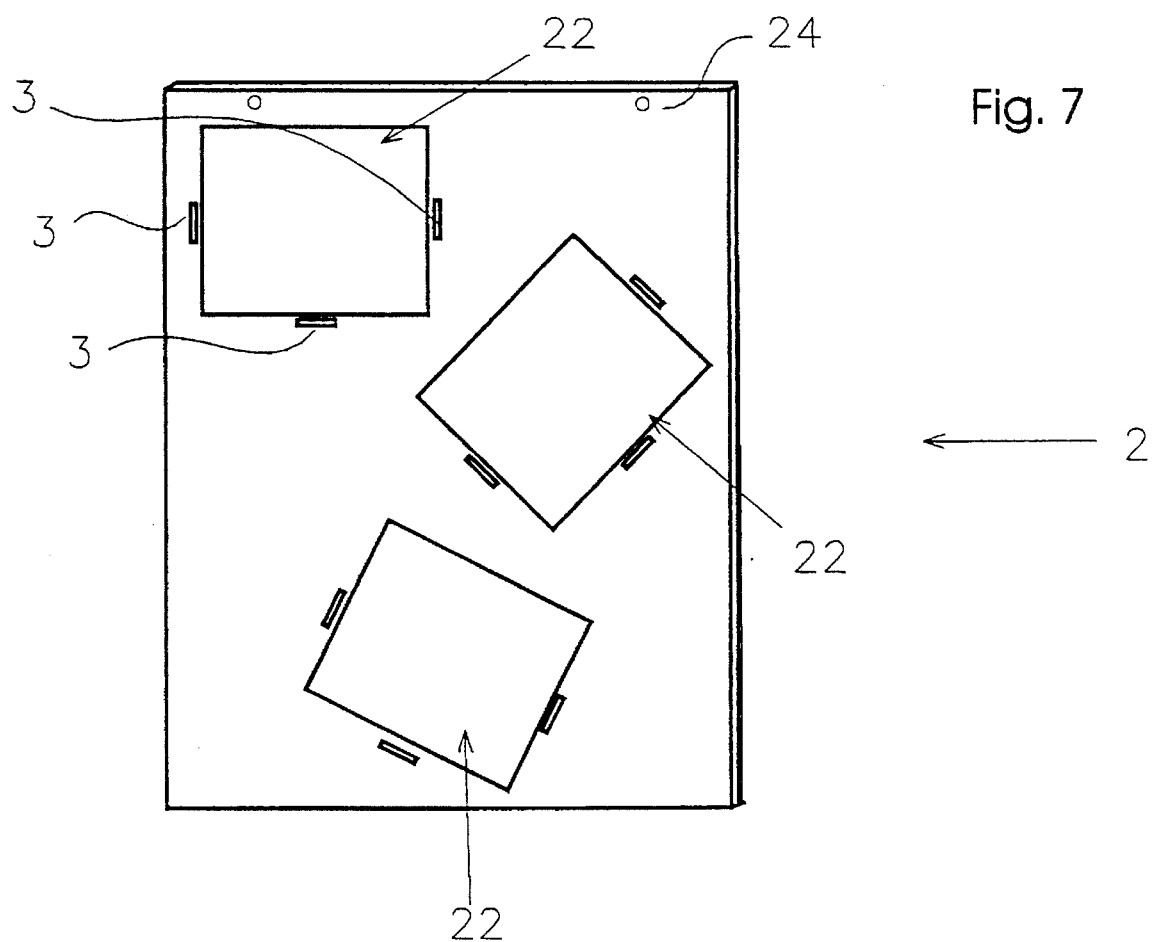
FIG. 7 shows an irregular arrangement of receiving sites.

A simple, free-standing display stand is produced by subdividing a CD holder 2 into several individual holder elements, connected together by hinges, as shown in FIG. 8. For that purpose, the support panel 21 is subdivided into individual flat elements. The shape of the support panel 21 corresponds to the development of the desired unit. The shape of the support panel 21 results from the form of the development. The same is true for the shared edges of the flat elements, hinged together to permit them to pivot. Particularly suitable for the purpose are film hinges made from the same material as the support panel. As display stands, the holders are set up in such a way that the CD cassettes face outward.

It is possible on the other hand to pivot the holder elements toward one another, so that the CD cassettes on the inner side are not outwardly visible. A box-like transport container for CD cassettes can be formed from such a display stand in the same way. Lock and carrying handle complete this transport container.

The subdivision into several flexibly connected holder elements even permits an arrangement in the manner of a CD album.

What is claimed is:

1. A holder for CD cassettes each having a rear side (101) and a pivoting lid (104), said holder comprising a support panel (21) equipped with at least one receiving site (22) for CD cassettes (100), said receiving site (22) having at least three clips (3) arranged on the support panel in such a way that they hold a CD cassette (100), inserted with its rear face (101) parallel to the support panel (21), partially surrounded by said clips on at least three sides, each of said clips being L-shaped and having an arm (32) serving as a stop, said stop arm (32) lying upon the support panel (21), and a clamp arm (38) disposed generally vertically to said stop arm (32).

2. The holder according to claim 1, wherein the clamp arm (38) has a retaining groove (33), in which one of a projecting cassette edge (102) of the cassette bottom (101) and a projecting cassette edge of the cassette cover (104) of the CD cassette (100) is received.

3. The holder according to claim 1, wherein the clip (3) has a retaining boss (35) which can come into contact with a side face of a CD cassette (100).

4. The holder according to claim 1, wherein the clip (3)

has a press-in surface (34) which is at an angle relative to a side face of the CD cassette (100).

5. The holder according to claim 2, wherein the clamp arm (38) has an angled press-out surface (34') arranged between said retaining groove (33) and a retaining boss (35).

6. The holder according to claim 5, wherein the clamp arm (38) has a flexible zone (39) in the region of the retaining groove (33).

7. The holder according to claim 1, wherein a plurality of receiving sites (22) are regularly arranged upon the support panel (21).

8. The holder according to claim 1, wherein a plurality of receiving sites (22) are irregularly arranged upon the support panel (21).

9. The holder according to claim 1, wherein the support panel (21) is subdivided into individual flat elements, in which case at least two neighboring flat elements are connected together in such a way that they can pivot.

* * * * *